July 4, 1961

A. R. BRILHART 2,990,744

MUSICAL WIND INSTRUMENT

Filed May 22, 1958

INVENTOR.
ARNOLD R. BRILHART

BY

Pennie, Edmonds, Morton, Barrows and Taylor

ATTORNEYS

July 4, 1961
A. R. BRILHART
2,990,744
MUSICAL WIND INSTRUMENT
Filed May 22, 1958
2 Sheets-Sheet 2
FIG. 3
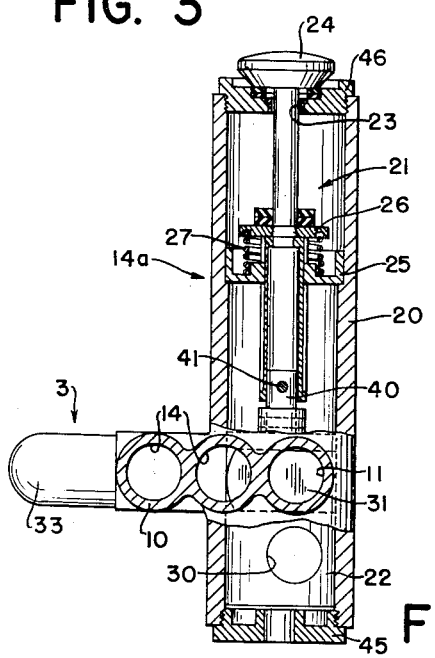
FIG. 4
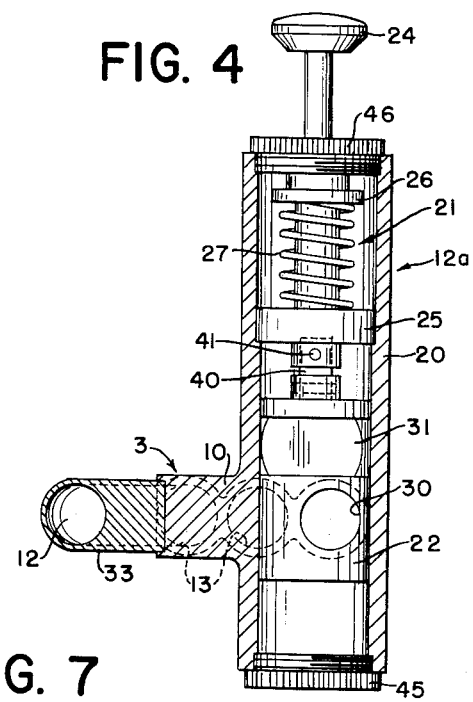
FIG. 5
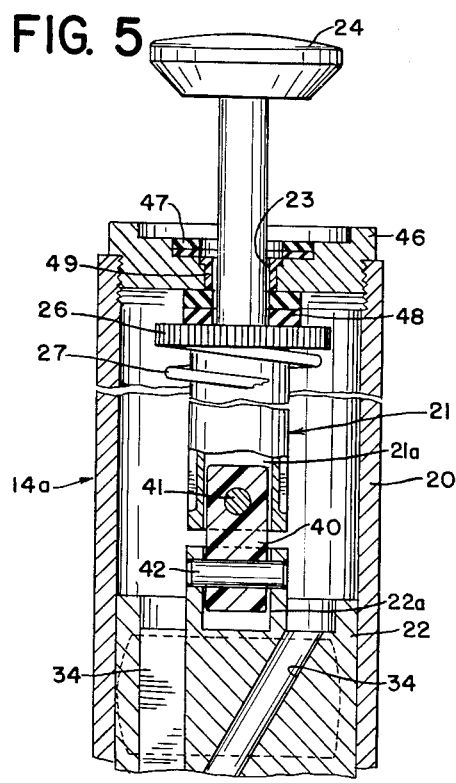
FIG. 7
FIG. 6
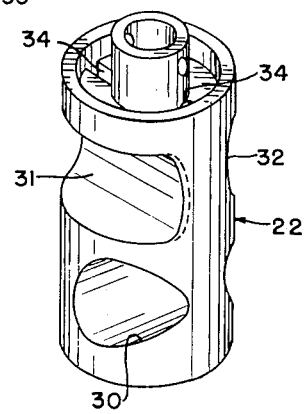
INVENTOR.
ARNOLD R. BRILHART
BY
ATTORNEYS
Pennie, Edmonds, Morton, Barrows and Taylor

United States Patent Office 2,990,744
Patented July 4, 1961

2,990,744
MUSICAL WIND INSTRUMENT
Arnold R. Brilhart, Carlsbad, Calif., assignor to Brilhart Musical Instrument Corporation, Carlsbad, Calif., a corporation of New York
Filed May 22, 1958, Ser. No. 737,107
8 Claims. (Cl. 84—392)

This invention relates to a control section for producing notes of the musical scale within a wind instrument, and in particular to an improved control section which may be constructed as a single unit having the advantage of inexpensive manufacture and facile, accurate operation.

Heretofore wind instruments, for example trumpets, cornets, bugles, and the like, have been made of tubular metal. Thus, because of the complexity of intricate air passages required for such instruments, their total cost of manufacture has been relatively high. Many attempts have therefore been made to produce musical instruments of this type in which the use of tubing is avoided. However, in the past, such attempts have ordinarily resulted in completely altering the design and operation of the traditional instrument with undesirable results both in appearance and operating characteristics.

The present invention provides means for eliminating the use of tubing in the control section of a wind instrument, where most of the air passage intricacies prevail, without materially altering the appearance of the instrument or its operation. Further, the improved control section of the invention is extremely simple to manufacture, and provides heretofore unknown facility of operation.

To these ends the control section of the invention comprises a housing through which extends a main wind passage and a plurality of auxiliary wind passages, the axes of these passages being arranged in the same plane. Each auxiliary passage has an inlet and an outlet end which communicate with the main wind passage. Further, the control section is provided with a plurality of piston valves for controlling the passage of air through the wind passages in the housing in order to produce the different musical notes of the scale. The operating axes of these valves are arranged at substantially right angles to the plane of the axes of the wind passages. The casings for the valves may therefore be made a component part of the housing. Due to the uniplanar arrangement of the wind passages in the housing, the control section of the invention may be constructed as a single unit. Therefore, for example, a casting operation may be employed in its manufacture thus eliminating the expensive and intricate tubing operations heretofore required. Further, due to the perpendicular relationship of the valves and the axial plane of the wind passages, the control section may be arranged to provide an external appearance generally similar to that of conventional tube manufactured instruments. In addition, the wind passages and valve arrangement of the improved control section of the invention all find their counterpart in conventional instruments and operate in substantially the same manner to produce the musical notes of the scale.

Further improvements of the invention are provided within the operating valves of the control section. As in the prior art each of these valves includes a piston slidably fitted within a casing and a manually operated stem element extending axially through the casing and connected to the piston. The stem element is designed to provide a manually induced operating axial movement to the piston which selectively positions the piston in either of two preselected normal positions. Further, each valve is associated with a separate and different one of the auxiliary wind passages and is intercalated between it and the main wind passage of the housing.

In accordance with the invention, however, the pistons, in being designed to cooperate with the uniplanar arrangement of the wind passages, provide further advantages. Each piston is identical and has an air passage extending therethrough which is arranged in axial coincidence with the main wind passage of the housing when the piston is in one of its preselected positions. In such position, therefore, air is routed through the main wind passage and by-passes the auxiliary wind passage associated with the piston. Further, the piston is provided with first and second channels arranged so that when the piston is in its second preselected position the first channel laterally communicates the main wind passage with the inlet end of the auxiliary wind passage and the second channel laterally communicates the main wind passage with the outlet end of the auxiliary wind passage. In this second position, therefore, air is routed through the auxiliary wind passage in order to vary the length of air travel to produce notes of the musical scale. In practice this relatively simple construction has been found to provide extreme ease of manufacture combined with great accuracy of operation.

Another of the improved valve features of the invention lies in the provision of a universal coupling device for linking the manual stem element to the piston. This coupling device is adapted to permit swinging motion of the stem element relative to the piston in at least two planes. In this way the heretofore troublesome binding of a valve due to any sidewise pressure on the stem element is prevented. Further, inadvertent sidewise pressure on the stem element during the playing of the instrument is translated to axial pressure on the piston thereby achieving optimum operation and preventing uneven wear of the piston and housing.

The universal coupling device of the invention may take a variety of forms. Two particular forms, however, have been found to be of special advantage. One such form comprises a rigid coupling element having a first pin passing therethrough at one of its ends. This pin also passes through the stem element of the valve and is adapted to permit swinging motion of the stem element thereabout. A second pin is then passed through the piston element and through the rigid coupling element at the other end thereof. This second pin is adapted to permit swinging motion of the coupling element thereabout. Further, both pins are positioned at substantially right angles with respect to one another. In this way the stem element is permitted to swing relative to the piston in two planes which are substantially at right angles.

The second form taken by the coupling device comprises a flexible coupling element connected at one end to the stem element and at the other end to the piston. In this way the stem element is permitted to swing in all directions relative to the piston.

A further feature of the valve assembly of the invention is the provision of an annular bearing positioned within a stem hole in the casing through which the stem element passes. With this arrangement the inner diameter of the bearing may be dimensioned to restrict the angle of sidewise pressure which may be exerted on the universal coupling device to within preselected limits.

The invention can best be understood by referring to the following drawings in which:

FIG. 3 is a section taken along line 3—3 of FIG. 2 to illustrate a valve as arranged in one of its two positions;

FIG. 4 is a section taken along line 4—4 of FIG. 2 to illustrate a valve as arranged in the other of its two positions;

FIG. 5 is an enlarged view of the control valve of FIGS. 3 or 4 which shows a universal coupling arranged in accordance with the invention;

FIG. 6 is a perspective view of a control valve piston in accordance with the invention; and FIG. 7 is a sectional view showing an embodiment of the universal coupling arrangement of the invention alternative to that of FIG. 5.

Figure 1:
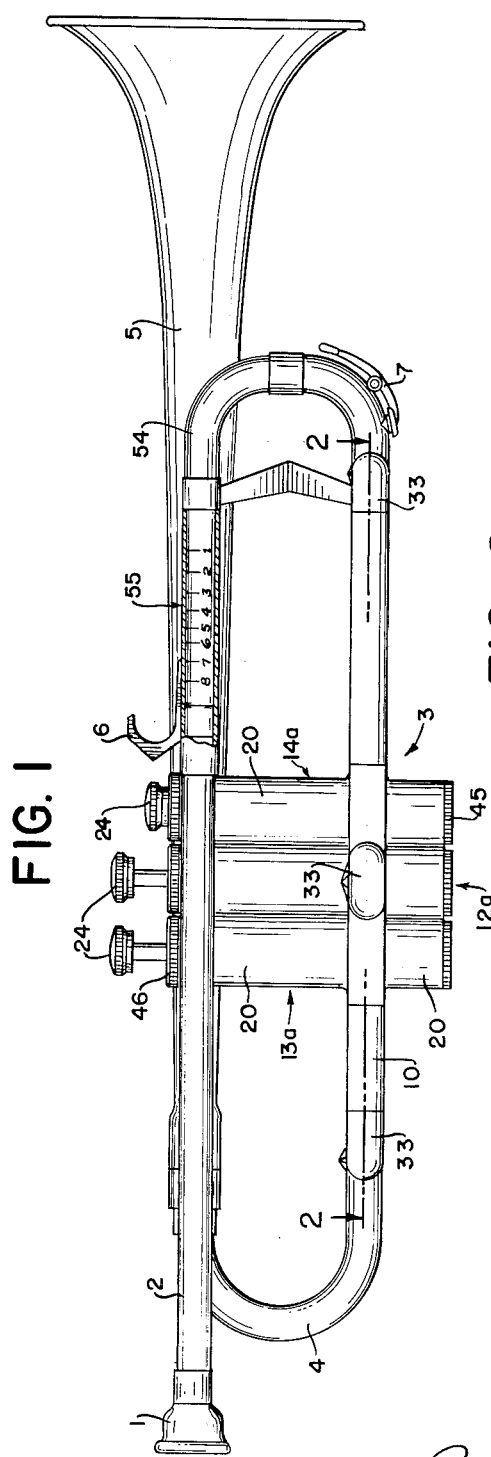
FIG. 1 is a side view of a wind instrument incorporating a control section in accordance with the invention.
Figure 2:
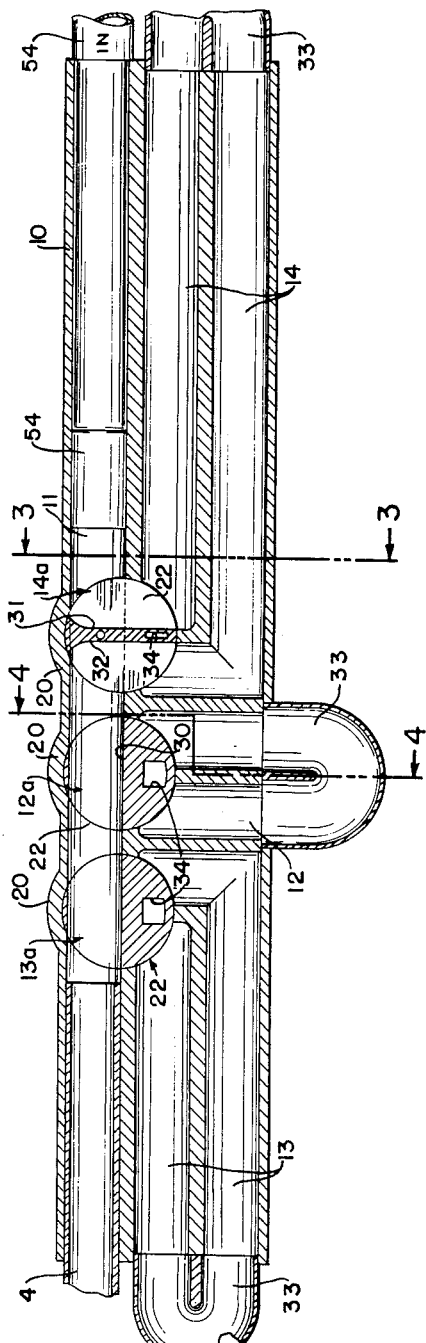
FIG. 2 is a section taken along line 2—2 of FIG. 1 to illustrate the control section of the invention.

Referring now to FIGS. 1 and 2, the invention is illustrated as employed in a trumpet for purposes of explanation. Generally the instrument comprises a mouthpiece 1 which is connected to one end of a first wind tube 2. The other end of wind tube 2 is connected into a control section, shown generally at 3. The air introduced by a player into the mouthpiece 1 travels through the first wind tube 2 into the control section. A second wind tube 4 is then connected to the point of exit of the control section to convey the air as a musical tone out of an output bell 5. As is generally known this combination of units as arranged in FIG. 1 forms in appearance substantially the traditional trumpet assembly. Other conventional items include a finger rest 6 and a valve 7 for the release of accumulated liquid.

The invention resides in the design of the control section 3 which is best described with reference to FIGS. 1 and 2. The control section comprises a unitary housing 10 having a number of wind passages therein. The first such passageway 11 is denoted the main wind passage and extends straight through the housing 10. As will be seen in FIG. 2, the first wind tube 2 and the second wind tube 4 are connected to different ends of the main wind passage 11, respectively. Thus the air introduced into the instrument follows a path comprising the mouthpiece 1, the first wind tube 2, the main wind passage 11, the second wind tube 4, and the bell 5.

In order for the wind instrument to form the various notes of the scale, auxiliary wind passages 12, 13, and 14 are also provided within the unitary housing. Each auxiliary wind passage has an inlet and an outlet end communicating with the main wind passage. Further, each auxiliary wind passage differs in length from the others, passage 12 being shortest, 13 being intermediate and 14 being longest. The function of the auxiliary wind passages in producing various notes of the scale derives from the elemental principle that the frequency of the output tone directly relates to the length of air travel through the wind instrument. The provision of three auxiliary passages of different lengths provides enough possible paths of different length in the instrument to encompass the entire musical scale.

In order to control the length of the air passages to produce the note desired, the control section further comprises a plurality of valves, 12a, 13a, and 14a, corresponding in number to the plurality of auxiliary wind passages. A separate and different one of these valves is intercalated between the ends of each auxiliary wind passage and the main wind passage. As is best seen in FIGS. 3 and 4, each valve comprises a casing 20 in which are positioned its two basic elements, a manually operated stem element, shown generally at 21, and a piston 22. The piston is slidably fitted snugly within the casing. In order to permit the piston to slide easily within the casing without compressing air due to its snug fit, openings 34 are provided therein. The stem extends axially through the casing, out of a stem hole 23 therein, and finally terminates in a button 24 used by the player in order to manually slide the piston axially within the casing.

A washer 25 having an annular depression therein is fitted within the casing against a shoulder preventing axial displacement relative to the casing. Further, a second washer 26 having an annular depression therein is mounted on the stem 21 so as to prevent axial displacement relative thereto. A spring 27 is compressed between these two washers so as to constantly exert an axial force on the stem relative to the casing. In this way the spring is employed to return the stem, and therefore the piston, to its original position after the player, having first depressed the button 24, releases it. Further, the spring provides two normal positions for the control valve, one position being when the button 24 is completely depressed and the second position being when the spring returns the button to its original position.

In order to produce prescribed notes by control of the length of air travel, each valve is adapted either to pass air through the main wind passage 11 while obstructing the passage of air into the auxiliary wind passage associated therewith, or to channel the passage of air from the main wind passage into the auxiliary wind passage associated therewith, in accordance with which one of the two positions of the piston prevails. This is effected by the provision of passages within the pistons 22 which are best described with reference to FIGS. 2, 3, 4, and 6. With the valve in its spring returned position, as represented by valve 12a shown in section in FIG. 4, the lower portion of the piston 22 comes into alignment with the wind passages of the unitary housing. A passageway 30 is provided within this lower portion of the piston and is arranged in axial coincidence with the main wind passage 11 so as to permit passage of air therethrough while blocking off the passage of air into the auxiliary wind passage 12 with which valve 12a is associated. Thus it will be seen that if all of the valves were in this raised position the flow of air through the instrument would take its shortest course directly through the main wind passage 11. On the other hand the production of other musical notes may be effected by depressing any combination of the valves in order to divert the air into any combination of auxiliary wind passages. Such a valve is illustrated in FIG. 3 representative of valve 14a in a depressed position. In such position the upper portion of the piston comes into alignment with the wind passages of the unitary housing. This upper portion contains a channeled indentation 31 arranged laterally across the wind passages and of sufficient length to communicate between the main wind passage 11 and the adjacent inlet end of an auxiliary passage, in this case passage 14. Further, channel 31 is provided in the piston immediately opposite channel 32. This channel laterally communicates the outlet end of auxiliary wind passage 14 to the main wind passage 11. In this way the air flowing into wind pipe 11 is diverted through channel 14 back to wind passage 11 thereby increasing its length of travel. It will be evident, therefore, that the possible varieties of length of air travel corresponds to the number of possible combinations of valve operations.

The advantages of the control section provided by the invention might well be noted at this time. Firstly, the operation of the instrument is completely traditional. The provision of valve-operated auxiliary wind passages varying in length has been maintained. The arrangement of the valves at right angles to the plane of the axes of the wind passages for facility of operation has also been maintained. Yet while maintaining these proven features, the invention provides changes which result in great saving in manufacturing cost. First, the auxiliary wind passages are all arranged with their axes in substantially the same plane. This permits the passages to be formed within a unitary housing which may be readily and inexpensively manufactured as, for example, by conventional casting procedures. The resultant elimination of the intricate tubing materials heretofore employed results in a great saving in the cost of manufacture. Further, the invention provides a valve piston configuration which simply and accurately produces the required selection of wind passage length. This very simplicity of construction of the pistons results in a further saving in cost and in accuracy of operation. In addition, the piston design permits the valve to be arranged at right angles to the plane of the axes of the wind passages to form a traditional external appearance of the wind instrument. It should also be noted that the casings for these valve assemblies may also be formed as part of the unitary control section housing by, for example, conventional casting means.

In FIG. 2 it will be noted that the auxiliary channels 12, 13, and 14 are U-shaped in order that the inlet and outlet ends may be brought close together. It has been found that the casting process is greatly simplified by making the U-shaped ends 33 of the auxiliary wind passages out of tubular material inserted into the housing. In this way the auxiliary wind passages may also be adjusted in length for individual tuning.

The invention further provides improvements in the construction of each control valve which permit greater accuracy and control of operation. These improvements are best illustrated in FIG. 5, wherein a first feature comprises a universal coupling device for linking the stem 21 to the piston 22. This device is adapted to permit swinging movement of the stem 21 in at least two planes relative to the piston 22. To this end the device comprises a rigid coupling element 40, preferably made of nylon. The stem 21 is hollowed out at 21a and fitted over one end of the coupling element 40. A pin 41 is passed through the stem element and the rigid coupling element and is adapted to permit a limited swinging motion of the stem thereabout, the hollowed out portion being sufficiently larger than the coupling element to permit such swinging motion. The other end of the coupling element 40 is passed into a hollowed-out section 22a of the piston 22 which is sufficiently larger than the coupling element to permit limited swinging motion between the two. A second pin 42 is passed through the piston and the rigid coupling element, this pin being adapted to permit a swinging motion of the coupling element thereabout. The pins are then positioned at substantially right angles with respect to each other. In this way the stem element can swing in either of two planes 90° apart. This permits any sidewise pressure on the stem element 21 through the button 24 to be translated into an axial pressure on the piston 22. As a result, binding of the piston is prevented, uneven, egg-shaped wear of the piston and housing is prevented, and the operation of the instrument remains optimal.

Another embodiment of this type of coupling is illustrated in FIG. 7 wherein a flexible coupling element 51 is wedged into the stem element 53 and the piston element 52. In this way swinging motion of the stem element 21 relative to piston 22 may take place in any plane.

It will be noted that the valve assembly may very easily be disassembled for cleaning or repair. To this end cap members 45 and 46 are threaded into the respective ends of the casing for ease of removal. As best shown in FIG. 5, cap member 46 employs a series of shoulders for the insertion of washer elements therein. A first one of these washer elements 47 is employed as a cushioning element for the button 24. Another such element is washer 48 which cushions the spring-induced return of the stem. Further, a washer 49 is inserted within the stem hole 23 through which the stem element 21 passes out of the casing. This washer element acts as a bearing element for the stem. An additional, important purpose of the bearing 49 is a participation in combination with the universal coupling of the stem element to the piston, for by selection of the inner diameter of bearing 49 the angle of sidewise pressure on the coupling device may be restricted to within predetermined limits. The bearing 49 may advantageously be made of nylon.

Another feature provided by the invention has proved to be of great service in the tuning of an instrument to a preselected pitch. This feature relates to the adjustable tuning slide 54 (FIG. 1) which forms a part of conventional wind instruments. Turning slide 50 is employed to adjust the length of the wind tube 2 so that the instrument may be tuned to a proper key. In order to facilitate this tuning operation the tuning slide has engraved thereon calibration marks 55 so that the player will have a series of reference positions for the tuning of his instrument.

A preferred embodiment of the invention has been described. Various changes and modifications may be made in the scope of the invention as set forth in the appended claims.

I claim:

1. A control section for a wind instrument having a valve assembly comprising a valve casing, a valve piston slidably fitted within said casing, a manually operable stem element passing axially through said casing and out of a stem hole therein, said stem element being connected to said piston to provide a manually induced operating axial movement to the piston, said connection including an axially-extending element coupling said stem element and said piston element and forming with said elements a universal coupling device.

2. A control section for a wind instrument as set forth in claim 1 in which the axially-extending coupling element is rigid and in which a first pin passes through said rigid coupling element at one end thereof and through said stem and permits limited swinging movement of said stem element relative to said rigid coupling element, and a second pin passes through the other end of said rigid coupling element and through said piston element, and permits limited swinging movement of said rigid member relative to said piston, said pins being positioned substantially at right angles to each other.

3. A control section for a wind instrument as set forth in claim 2 in which said rigid coupling element is nylon.

4. A control section for a wind instrument as set forth in claim 1 in which said coupling element is flexible.

5. A control section for a wind instrument as set forth in claim 4 in which said flexible coupling element is rubber.

6. A control section for a wind instrument as set forth in claim 1 in which an anular bearing is positioned in said stem hole, the inner diameter of said bearing being such as to restrict the angle of sidewise pressure which may be exerted on the universal coupling device to preselected limits.

7. A control section for a wind instrument as set forth in claim 1 in which said valve casing is part of a housing having a plurality of like valve casings and valve pistons therein, and having a main wind passage and a plurality of auxiliary wind passages extending therethrough, each of said auxiliary wind passages having an inlet and an outlet communicating with said main wind passage, the axes of all of said wind passages being in a substantially horizontal plane, said valve casings having their axes arranged substantially at right angles to the plane of said wind passages, a separate and different one of said valve casings being intercalated between the ends of each said auxiliary wind passage and said main wind passage, the valve piston of each valve casing having an air passage extending therethrough and positioned to be in axial coincidence with said main wind passage when the piston is in a preselected position, thereby to route air through said main wind passage and to by-pass said auxiliary wind passage associated with the casing in which the piston is located, each of said pistons further being provided with first and second channels arranged so that when the piston is in another preselected position, said first channel laterally communicates said main wind passage with said inlet end of the auxiliary wind passage associated with the casing in which the piston is located, and said second channel communicates said main wind passage with the outlet end of the auxiliary wind passage associated with the valve casing in which the piston is located, thereby to route air through said auxiliary wind passage.

8. A wind instrument having a control section as set forth in claim 7 and including first and second wind tubes connected to opposite ends of said main wind passage, a mouth piece fitted at one end of said first wind tubes and a bell fitted at one end of said second wind tube, means for adjusting the tuning of said instrument comprising a substantially U-shaped wind tube having its ends slidably fitted with certain of said auxiliary wind passages, whereby slidable adjustment of the position of said U-shaped tube with respect to said first and second tubes tunes said wind instrument, and calibration marks on a mating portion of said U-shaped wind tube to indicate the slidable position thereof.

References Cited in the file of this patent

UNITED STATES PATENTS

| | | |
|---|---|---|
| 64,582 | Schreiber | May 7, 1867 |
| 199,516 | Conn | Jan. 22, 1878 |
| 1,277,012 | White | Aug. 27, 1918 |
| 2,003,995 | Einhorn | June 4, 1935 |
| 2,320,202 | Thompson | May 25, 1943 |
| 2,790,345 | Greenleaf | Apr. 30, 1957 |

FOREIGN PATENTS

| | | |
|---|---|---|
| 537 | Great Britain | Jan. 7, 1901 |
| 249,837 | Italy | Aug. 18, 1926 |

OTHER REFERENCES

Product Engineering (publication), July 1950, pages 102–107, title of article: Nylon in Bearings and Gears.